United States Patent
Adams et al.

(10) Patent No.: US 6,389,995 B1
(45) Date of Patent: May 21, 2002

(54) METHOD OF COMBUSTION AND A COMBUSTION PLANT IN WHICH ABSORBENT IS REGENERATED

(75) Inventors: Christopher Adams; Jim Anderson; Mats Andersson; Roine Brännström, all of Finspång (SE); John Weatherby, Knutsford (GB)

(73) Assignee: ABB Carbon AB, Finspang (SE)

( * ) Notice: Subject to any disclaimer, the term of this patent is extended or adjusted under 35 U.S.C. 154(b) by 0 days.

(21) Appl. No.: 09/171,011

(22) PCT Filed: Apr. 10, 1997

(86) PCT No.: PCT/SE97/00598

§ 371 Date: Dec. 21, 1998

§ 102(e) Date: Dec. 21, 1998

(87) PCT Pub. No.: WO97/39281

PCT Pub. Date: Oct. 23, 1997

(30) Foreign Application Priority Data

Dec. 4, 1996 (SE) .................................. 9601393

(51) Int. Cl.[7] .......................... F23G 7/00; F27B 15/02
(52) U.S. Cl. .................. 110/245; 110/188; 110/204; 110/203; 110/248; 122/4 D; 422/146; 422/147; 422/143
(58) Field of Search ................... 110/188, 203, 110/204, 205, 216, 245, 259, 260, 261, 262, 263, 346, 347, 348; 122/4 D, 22, 211; 432/215; 431/7; 422/139, 143, 144, 145, 146, 147; 60/39.464

(56) References Cited

U.S. PATENT DOCUMENTS

| 4,021,184 A | 5/1977 | Priestley .................. 431/7 |
| 4,103,646 A | 8/1978 | Yerushalmi et al. ......... 122/4 D |
| 4,406,128 A | * 9/1983 | Fanaritis et al. .......... 122/4 D X |
| 4,419,965 A | 12/1983 | Garcia-Mallol et al. ..... 122/4 D |
| 4,714,032 A | 12/1987 | Dickinson ................... 110/347 |
| 4,722,182 A | * 2/1988 | Brännström .......... 60/39.464 X |
| 4,730,563 A | 3/1988 | Thörnblad ................. 110/216 |
| 4,827,723 A | * 5/1989 | Engström et al. ....... 122/4 D X |
| 5,154,732 A | 10/1992 | Hakulin et al. ............. 48/62 R |
| 5,297,622 A | * 3/1994 | Brännström et al. .... 122/4 D X |
| 5,347,954 A | 9/1994 | Dietz ........................ 122/4 D |

FOREIGN PATENT DOCUMENTS

| EP | 0 176 293 B1 | 4/1986 |
| EP | 0 193 205 A2 | 9/1986 |
| SE | 0304931 | 8/1988 |
| SE | 457 013 | 11/1988 |
| SE | 460 148 | 9/1989 |
| WO | WO 94/21965 | 9/1994 |

* cited by examiner

Primary Examiner—Ira S. Lazarus
Assistant Examiner—Liljana V. Ciric
(74) Attorney, Agent, or Firm—Connolly, Bove Lodge & Hutz LLP

(57) ABSTRACT

A method of combustion and a combustion plant in which absorbent is regenerated is described herein. During the combustion of a fuel in a combustion chamber enclosing a fluidized bed, a fuel and an absorbent are supplied to the fluidized bed. The combustion gases generated during the combustion are collected and purified in a separating member by separation of solid material from the combustion gases. The separated solid material is recirculated to the fluidized bed through a channel, and a gaseous medium is supplied in a controlled manner to the separated solid material present in the channel in order to displace the combustion gases and provide a chemical reaction.

32 Claims, 7 Drawing Sheets

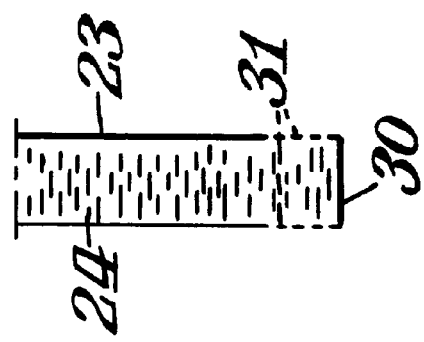
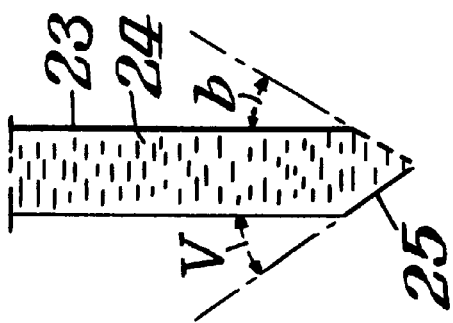
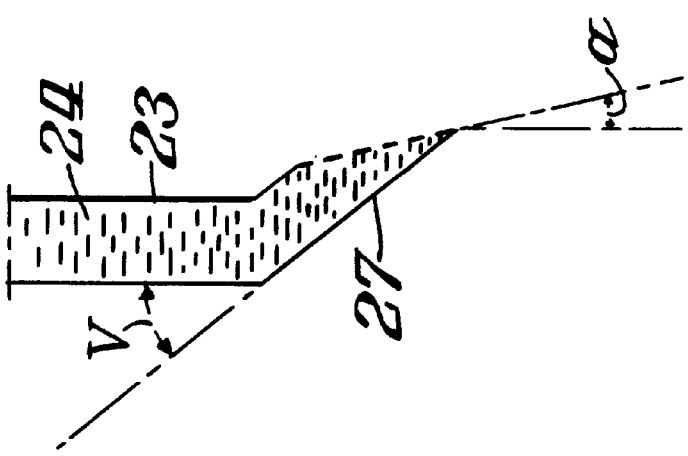
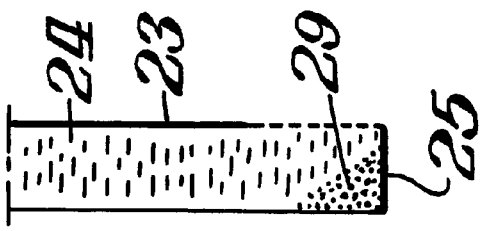

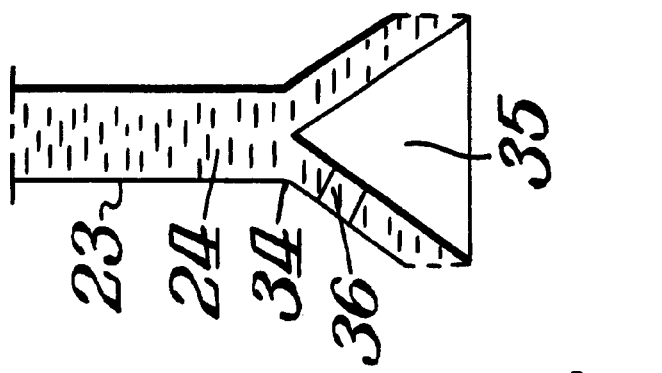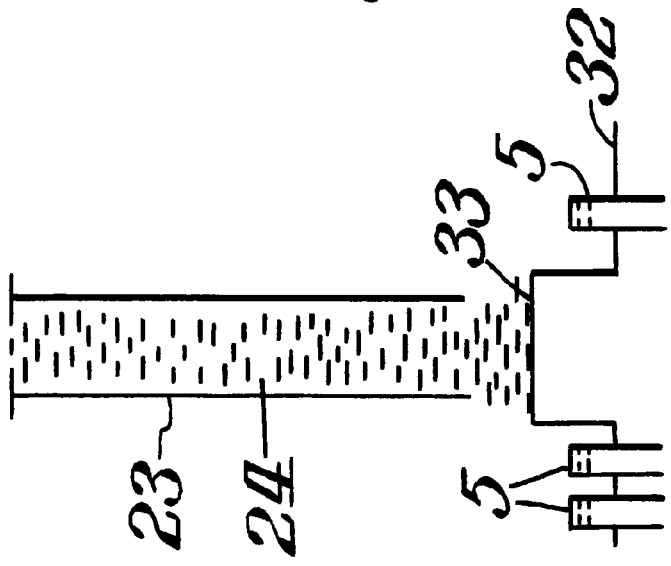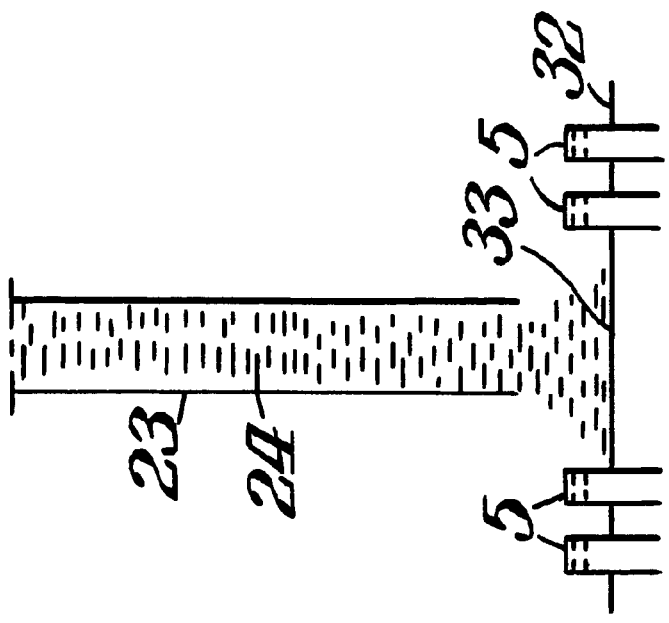

METHOD OF COMBUSTION AND A COMBUSTION PLANT IN WHICH ABSORBENT IS REGENERATED

The present invention refers to a method of combustion of a fuel in a combustion chamber enclosing a fluidized bed, comprising the steps of: supplying an oxygen-containing gas to the bed from beneath; supplying a fuel and an absorbent to the bed; collecting combustion gases formed during the combustion; purifying the combustion gases by separating solid material therefrom; and recirculating the solid material separated to the combustion chamber through a channel. Furthermore, the invention refers to a combustion plant comprising: a combustion chamber, which is provided to enclose a fluidized bed and in which a combustion of a fuel is intended to be performed while forming combustion gases and during the supply of an absorbent; and a purification device for purifying said combustion gases, said purification device comprising a separating member, arranged to separate particulate material from said combustion gases, and a channel, connecting the separating member and the combustion chamber and being arranged to recirculate the material separated to the combustion chamber.

It is known to combust different fuels in a bed of particulate, incombustible material, which bed is supplied with combustion air from beneath through nozzles in such a manner that the bed becomes fluidized. There is a difference between different types of such combustion in a fluidized bed, which operate according to different principles and under different conditions. Firstly, there is a difference between an atmospheric bed and a pressurized bed. In comparison with an atmospheric bed, a pressurized fluidized bed is characterized by a small plant size in relation to the effect produced, by a high efficiency, and in that the combustion occurs under advantageous conditions from an environmental and economical point of view. A pressurized bed may have a larger height than atmospheric bed since one may operate with greater pressure drops. Among the atmospheric beds, so-called circulating beds are frequently used, in which the bed material is permitted to circulate through a separating device in order to be recirculated to the bed. This enables unburnt fuel to be recirculated, which improves the efficiency of the combustion, as well as the absorbent material not used for absorption of contaminants, sulfur, which decreases the discharge from the combustion. However, such circulating beds operate with relatively high fluidizing velocities, in typical cases in the order of 5–12 m/s. Fluidizing velocity is the velocity that the gas would have had if it would have flowed through the combustion chamber without the pressure of particles. This high velocity causes problems with erosion of for instance the steam tube arrangement provided in bed in such a way that the lifetime thereof significantly decreases. Furthermore, one may discern the so-called bubbling beds in which the fluidizing velocity is relatively low, in typical cases between 0.5 and 2 m/s. Such a bed is relatively well defined in a vertical direction and there is formed a space, called a freeboard, in the combustion chamber above the bed. In this freeboard a relatively small amount of dust particles are present in comparison with a circulating bed but there is essentially no pressure drop across the freeboard.

In recent time some have tried to provide a certain circulation in pressurized beds by supplying the combustion cases leaving the combustion chamber to a cyclone for separation of solid material, which is recirculated to the combustion chamber. In order to obtain completely the desired effect concerning the degree of utilization of the absorbent and the combustion efficiency by the recirculation, the solid material should be supplied at the bottom of the fluidized bed. This means that one has to overcome the pressure drop which is present in the bed and in the cyclone, in typical cases about 0.5 bars.

In order to overcome this pressure drop it has been suggested to provide a dosing device, for example of a cell feeding type, at the end of a recirculating pipe provided preferably vertically and connecting the cyclone to a combustion chamber. The dosing device may comprise a rotatable shutter provided on the pipe and having a weight which in normal cases keeps the shutter in a closed position. When the amount of material in the pipe is sufficient the weight thereof will overcome the weight of the shutter which means that the shutter is opened and the material is discharged. Such a device leads to an intermittent recirculation of solid material. However, such devices do not function in the way intended in the environment of a fluidized bed due to the movements occurring in the bed and the forces caused by these movements. Furthermore, such devices are rapidly destroyed due to the aggressive, erosive and corrosive environment.

Another solution is an L-valve located in the bed and having a vertical portion in which a column of material is built up. In order to provide a flow of material through the channel such a device requires that gas is injected in the lower portion of the L-valve and in order to provide stability it is necessary to continuously measure the height of the column of material, which is very difficult, if not impossible, in the actual environment.

SE-B-460 148 suggests another way of overcoming this pressure drop. SE-B-460 148 discloses a combustion plant having a combustion chamber enclosing a pressurized fluidized bed for the combustion of a fuel while forming combustion gases. Furthermore, the plant comprises a purification of said combustion gases in several stages. In the stage particulate material is separated by means of a cyclone from the combustion gases and supplied to a collection chamber beneath the cyclone. Via a horizontal recirculating channel, the collected dust particles are fed back to the combustion chamber in order to improve the use of unburnt fuel and absorbent material. The recirculation is accomplished by means of an air driven ejector blowing the material into the combustion chamber. However, such an air injection is very expensive. The increase in the absorbent utilization and the combustion efficiency is lost for the compressor providing primary air to the ejector. In addition, this method leads to erosion.

It should be noted that the recirculation of solid material separated from the combustion gases means that the recirculated fine part may provide as much as 10–40% of the mass of the bed, which strongly influences the heat transfer coefficient to the tubes located in the bed. The fine part is comprised of particles having a largest diameter of about 300–400 $\mu$m and an average particle diameter of about 50–150 $\mu$m.

U.S. Pat. No. 4,021,184 discloses a combustion plant developed for the combustion of waste material. The plant comprises a combustion chamber for a recirculating fluidized bed. The bed disclosed in this document is not pressurized but the plant operates at atmospheric pressure and is of a diluted type (dilute phase fluidized bed), i.e. the fluidized bed fills up the whole combustion chamber. Such a type of bed means that a very large part of the solid, hot bed material will be transported out from the combustion chamber together with the combustion gases formed during the combustion.

Therefore, it is suggested that cyclones for separating dust particles from these gases are provided at the outlet of the combustion chamber and that the separated, hot dust particles are recirculated to the combustion chamber via conduit pipes connecting the cyclones with the combustion chamber. In such a manner it is possible to recover the heat energy in the dust particles leaving the combustion chamber. Thus, a recirculation may be obtained due to the low pressure drop across the bed, i.e. the whole combustion chamber. In addition, the valve mentioned (trickle valve) in the end of the conduit pipe is probably necessary.

EP-B-176 293 discloses another combustion plant having a combustion chamber which encloses a fluidized bed and in which combustion of a fuel is intended to be performed while forming combustion gases. The bed is of a bubbling type but the combustion chamber operates at atmospheric pressure. Furthermore, the plant comprises a cyclone for separating particulate material from the combustion gases and provided above the combustion chamber. The particulate material separated is conducted via a pipe back into the bed by letting the material simply fall freely through the pipe. This is possible since the bed disclosed in this document has a relatively low height, about 1 m. Thereby, also the pressure drop is relatively small.

U.S. Pat. No. 4,103,646 discloses a plant comprising two combustion chambers, the first combustion chamber having a fast fluidized bed, i.e., the fluidizing velocity is between 7 and 10 m/s, and the second combustion chamber having a "slow", bubbling fluidized bed. The combustion gases formed in the first combustion chamber are conducted to a cyclone, where solid material is separated and fed to the second combustion chamber. In the bottom of the second combustion chamber there is a discharge channel for solid material which by means of air injection then is recirculated to the first fast combustion chamber.

By recirculating the separated material to the bed a higher degree of utilization of the absorbent supplied to the combustion chamber is obtained since its time of presence in the process may be prolonged.

SUMMARY OF THE INVENTION

The object of the present invention is to provide a method and a combustion plant by which the discharge of undesirable substances may be reduced. In particular, the invention aims at a higher degree of utilization of the absorbent supplied to the combustion for absorbing undesirable substances.

This object is obtained by the method initially defined and characterized in that a gaseous medium in a controlled manner is supplied to the separated solid material present in the channel in order to displace the combustion gases and provide a chemical reaction. During heating of the absorbent, which for instance may be present in the form of a natural lime-containing substance such as limestone or dolomite, in the combustion chamber carbon dioxide evaporates from $CaCO_3$, thereby forming quick lime. This has very good ability of binding sulphur, released during the combustion, thereby forming gypsum. However, in order to be able to obtain large quantities of quick lime, the partial pressure of carbon dioxide has to be low in the gas surrounding the lime-containing absorbent. By the supply in a controlled manner, in accordance with the present invention of a gaseous medium to the separated solid material present in the channel, the partial pressure of the carbon dioxide may be lowered in this channel in such a manner that the absorbent present in the separated material reacts and forms quick lime. Thus, by means of the present invention, the ability of the absorbent to absorb undesirable substances such as sulphur is improved to a high extent. Consequently, by the method according to the invention a reduction of the discharges of undesirable substances may be obtained. The method according to the invention also is suitable for absorption of for instance alkali compounds, chlorine compounds, chlorine and heavy metals.

According to an embodiment of the invention, the gaseous medium is preheated prior to being supplied to the separated material in the channel. In such a manner, the environmental capacity of the plant may be further improved since the ability of the absorbent to evaporate carbon dioxide and absorb sulphur or other undesirable substances increases as the temperature increases. Preferably, the gaseous medium is preheated to a temperature of about 600–900° C., preferably 700–870° C.

According to a further embodiment of the invention, the gaseous medium comprises air. This is a very advantageous embodiment of the invention, which permits a simple structure of the gas supply according to the invention. The gaseous medium may also comprise steam. Water forms calcium hydroxide together with quick lime. Furthermore, the gaseous medium may comprise nitrogen or a combination of at least two of said substances.

According to a further embodiment of the invention, the gaseous medium is supplied to the channel at a plurality of levels of different height. Thereby the degree of utilization of the absorbent may be further improved. In such a preferred application, air and/or nitrogen is supplied to the channel at a higher level and steam is supplied to the channel at a lower level.

According to a further embodiment of the invention, the absorbent comprises a lime-containing material, for example limestone or dolomite.

According to a further embodiment of the invention, the separated material is supplied to a channel in such a manner that a column of material is formed therein and that the column of material merely due to its weight recirculates the separated material in a continues flow through a passage having a constant opening area and being provided in the lower portion of the channel. Thus, the discharge of the material into the combustion chamber is performed merely by the weight of the column of material and without any influence from outside by previously used auxiliary means such as ejectors or the like. The operation of the plant ensures that the column of material is filled from above through the separating member. Advantageously, the height of the column of material so formed exceeds the height of the bed. Furthermore, the gas from beneath is prevented from entering the channel. In such a manner no fluidization of the material present in the channel may take place and the recirculation of the material will not be hindered.

The object mentioned above is also obtained by the combustion plant initially defined and characterized by at least one member connected to the channel and arranged to supply a gaseous medium to the separated material present in the channel.

There are several preferred embodiments of the combustion plant of the present invention.

Advantageously, heating members are arranged to preheat the gaseous medium. The heating member may comprise a heat exchanger provided in the combustion chamber.

According to a preferred embodiment, the channel comprises an enlarged portion arranged to provide an increased volume to the column of material. By such an enlarged portion, the time of presence of the separated material in the column of material may be further prolonged.

According to a further preferred embodiment of the invention, the gas supply member comprises at least one gas feeding device provided in wall of the channel. Advantageously, this device may comprise a cylinder provided around the channel and having an upper and lower limiting wall so that a closed annular space is formed between the channel and the cylinder and the wall of the channel may comprise a passage between the interior of the channel and the annular space.

According to a further advantageous embodiment, the channel comprises passive means which are provided in such a manner that a column of material is formed in the channel during the operation of the combustion plant and which are forming, in the lower part of the channel, a passage which permits that the weight of the column of material discharges the material therethrough in a continues flow. The flow area of the passage may be constant. Thus, merely the weight of the column of material will provide a continuous and uniform recirculation of separated solid particulate material into the combustion chamber. Since the recirculating device according to the invention comprises passive means not requiring any compressor or other drive means for overcoming the pressure difference and feed out the material from the column of material, the cost of the device is favourable with respect to manufacture as well as operation. Furthermore, the problems of erosion in connection with ejector feeding of the material are avoided. Thus, since the recirculating channel does not comprise any movable structural elements, the reliability thereof is very high.

Furthermore, the passive means may comprise a surface which is provided at the lower end of the channel and seen from beneath covers at least a larger part of the cross-section area of the channel. This surface may form an angle of inclination to a vertical axis which amounts to about 20–90°, preferably 21–39°. By such a sloping surface, gas is prevented from entering the channel and at the same time the surface facilitates the recirculation of the material into the combustion chamber. The surface having such a favourable angle of inclination will function as sliding surface or a type of chute for the material.

BRIEF DESCRIPTION OF THE DRAWINGS

The invention will now be explained by means of different embodiments, defined by way of example, and with reference to the drawings attached. In the drawings:

FIGS. 6–12 disclose different embodiments of the recirculation channel.

DETAILED DESCRIPTION OF DIFFERENT EMBODIMENTS

Figure 1:
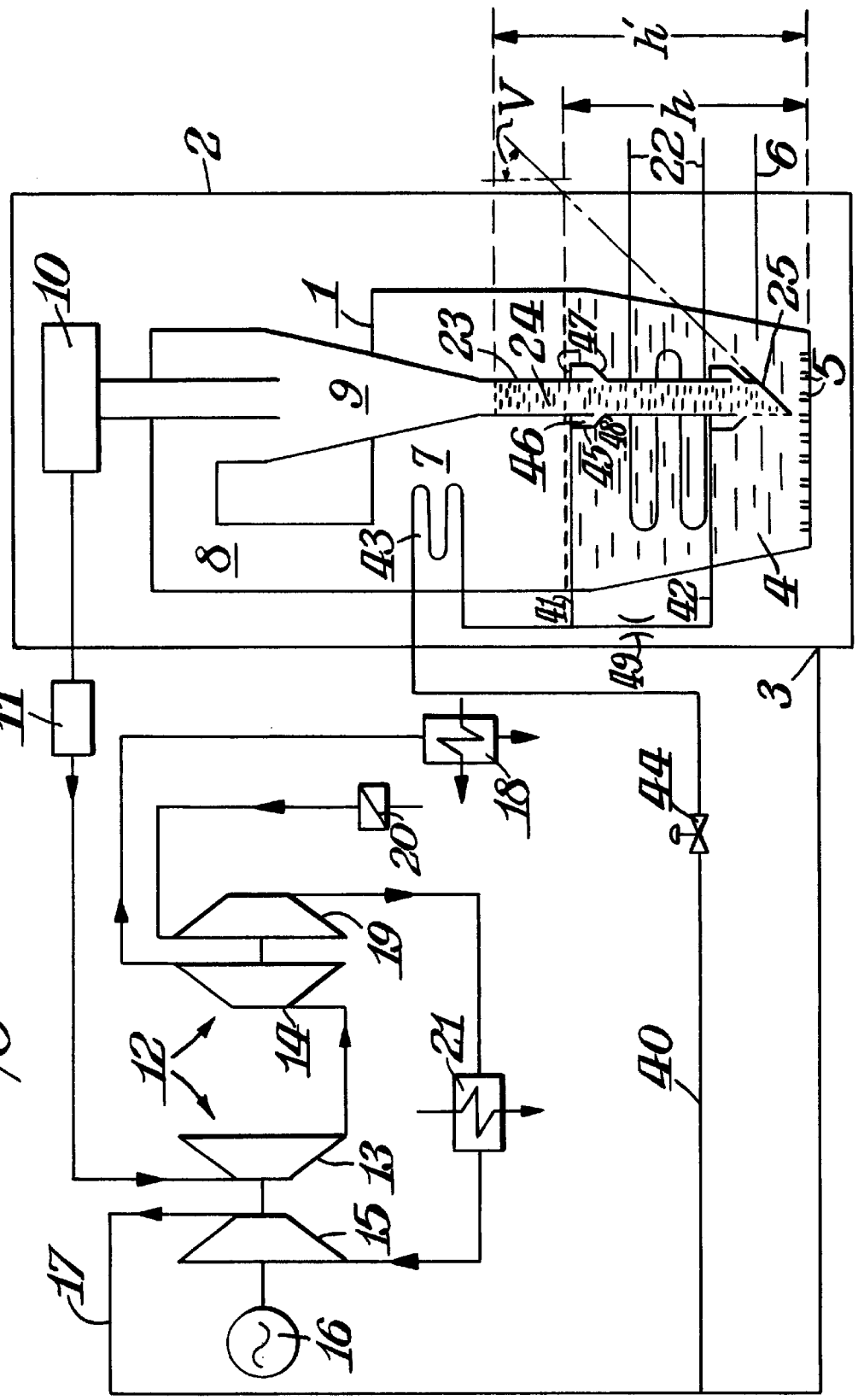
FIG. 1 discloses schematically a PFBC-power plant having a combined gas and steam cycle (the latter not disclosed)

The invention will now be explained with a reference to a so called PFBC-power plant (pressurized, fluidized bed combustion). However, it should be noted that the invention also is applicable to other types of plants, in particular combustion plants without power production. A PFBC-power plant, i.e. a plant for the combustion of particulate fuel in a pressurized, fluidized bed, is schematically disclosed in FIG. 1. The plant comprises a combustion chamber 1 being housed in a pressure vessel 2, having a volume in the order of $10^4$ m$^3$ and which may be pressurized to for example between 7 and 30 bars (abs). Compressed oxygen-containing gas, in the example disclosed air, is supplied to the pressure vessel 2 at 3 for pressurizing the combustion chamber 1 and for fluidizing a bed 4 in the combustion chamber 1. The compressed air is supplied to the combustion chamber 1 via schematically indicated fluidizing nozzles 5 being provided in the bottom of the combustion chamber 1 for fluidizing the bed 4 enclosed in the combustion chamber 1. The air is supplied in such a manner that a fluidizing velocity of about 0.5–2.0 m/s is obtained. The bed 4 is of a bubbling type and may have a height h being about 2–6 m. It comprises a non-combustible, particulate bed material, particulate absorbent and a particulate fuel. The particle size of the bed material not circulating, the absorbent and the fuel is between about 0.5 and 7 mm. The bed material comprises for example ashes and/or sand and the absorbent a lime containing material, for example dolomite or limestone for absorption of undesirable substances released during the combustion, e.g. sulphur, chlorine, heavy metals, alkali compounds etc. The fuel is supplied in such a quantity that it forms about 1% of the bed. By fuel is meant all fuels which may burn such as for example pit coal, brown coal, coke, peat, biofuel, oil shale, pet coke, waste, oils, hydrogen gas and other gases, etc. The bed material, the absorbent and the fuel are supplied to the bed 4, via a conduit 6 schematically disclosed. The fuel is combusted in the fluidizing air supplied to the bed 4 while forming combustion gases. These are collected in a space 7 located above the bubbling bed 4, a so called freeboard, and are then conducted via a channel 8 to a separating member 9, in the example disclosed a cyclone. From there the combustion gases are conducted further to further purification devices, which are disclosed schematically at 10 and which for example may comprise cyclones provided in several stages. Thereafter, the combustion gases are conducted further via for example a high temperature filter 11 to a gas turbine 12 which in the example disclosed comprises a high pressure stage 13 and a low pressure stage 14. The high pressure turbine 13 is provided on the same shaft as the high pressure compressor 15 and a generator 16 which in this manner is driven by the high pressure turbine for producing electrical energy. The high pressure compressor 15 delivers compressed air to the combustion chamber 1 via the conduit 17.

The combustion gases expanded in the high pressure turbine 13 are conducted to a low pressure turbine 14. The combustion gases leaving the low pressure turbine 14 still comprise energy which may be recovered in an economizer 18. The low pressure turbine 14 is provided on the same shaft as the low pressure compressor 19 which is supplied with air from the atmosphere via a filter 20. The low pressure compressor 19 is thus driven by the low pressure turbine 14 and provides from its outlet the high pressure compressor 15 with air which has been compressed in a first stage. Between the low pressure compressor 19 and the high pressure compressor 15 an intermediate cooler 21 is provided for lowering the temperature of the air supplied to the inlet of the high pressure compressor 15.

Furthermore, the power plant comprises a steam turbine side, which is not disclosed, but indicated by the arrangement in a form of a tube set 22, which is submerged in the fluidized bed 4. In the tube set 22 water is circulated evaporated and superheated by heat-exchange between the tubes and the bed material for receiving the heat produced by the combustion performed in the bed 4.

In the cyclone 9 provided in connection to the combustion chamber and also called zero step cyclone, solid particulate material is separated from the combustion gases. These solid particulate material comprises on one hand bed material and ashes but also unburnt fuel and absorbent. It is therefore desirable to recirculate this unused material to the bed 4 for, if possible, combust unburnt fuel and utilize unused absorbent. This recirculation is performed by a recirculation device comprising a channel 23. The channel 23 shall be configured in such a manner that a column 24 of material is formed in the channel 23 during the operation of the plant. The column 24 of material so formed shall have a height h' exceeding the height h of the bed 4. Due to this height difference the gravity will influence the material in the column 24 of material in such a manner that this is fed continuously downwardly into the combustion chamber 1 and in the examples disclosed downwardly into the bed 4 under the tube set 22. This height difference may be provided by a variety of different embodiments of the channel 23. The channel 23 may have an arbitrary cross-section, for instance circular, oval elliptic, rectangular, polygonal etc. In FIG. 1 the recirculation device comprises an inclined wall 25 in the lowest portion of the channel 23, which in co-operation with the channel 23 forms a passage with a constant flow area. Thus, the orifice of the channel 23 is formed by the lowest edge of the inclined wall 25 and an edge of the channel 23 thereabove. The inclined wall may have an angle v of inclination in relation to the vertical axis which amounts to about 20 to 90°, i.e. in the extreme case is perpendicular to said vertical axis. A preferred angle v of inclination is between about 21 and 39°. The inclined wall 25 prevents the gas flowing upwardly from the nozzles 5 from entering the channel and functions as sliding surface for the material flowing downwardly. In such a manner a column of material of the downwardly flowing material is formed. In order to reduce the recirculation velocity the opening area of the orifice may be less than the cross-section area of the channel 23. It should be noted that the orifice in the example disclosed in FIG. 1 is completely located in an essentially vertical plane. Since merely small quantities of the combustion air flowing upwardly thus may enter the channel 23 no fluidizing of the material present in the channel 23 will take place.

FIGS. 2–5 disclose other embodiments of the recirculation channel 23 and the separating member 9. It should be noted that elements having a corresponding function have been provided with the same reference signs in the different embodiments.

Figure 2:
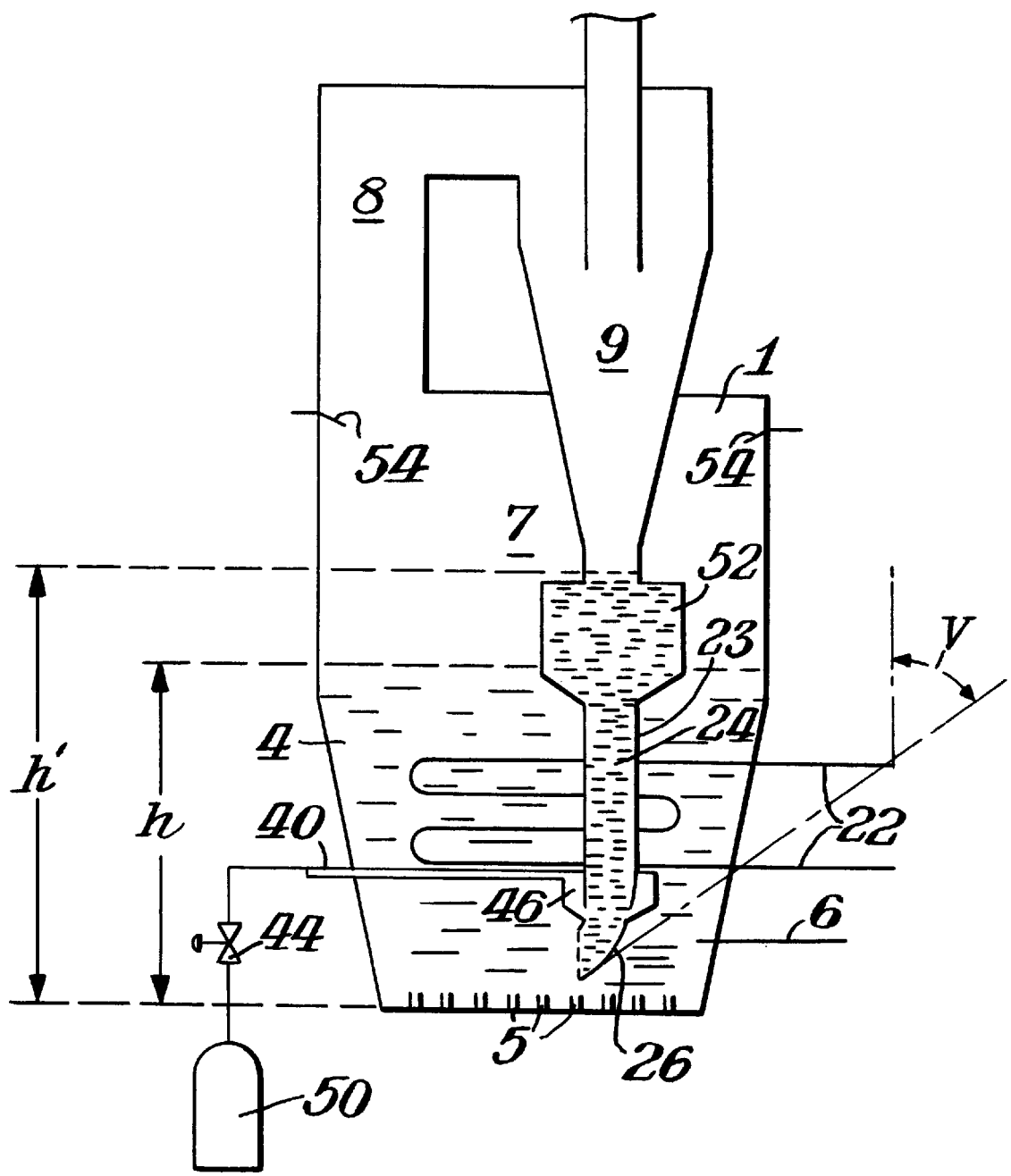
FIGS. 2–5 disclose different embodiments of a combustion chamber and a recirculation channel of the power plant according to the invention for solid material separated from the combustion gases.

The recirculation device disclosed in FIG. 2 comprises a relatively soft curve 26 in the lower part of the channel 23. The orifice is also in this example formed by cutting the channel 23 in an essentially vertical plane. A lower tangential plane of the curve 26 at the end of the channel is inclined in relation to a vertical axis by the angle v which may have the same value as in the example disclosed in FIG. 1. The curve 26 disclosed forms a passage which will prevent gas flowing upwardly from entering the channel 23 and function as a sliding surface for the material flowing downwardly. In order to reduce the recirculation velocity of the material the channel 23 may have a smaller cross-section area at the curve 26 than upstream thereof. In addition, the cyclone 9 disclosed in FIG. 2 is completely enclosed in the combustion chamber 1.

Figure 3:
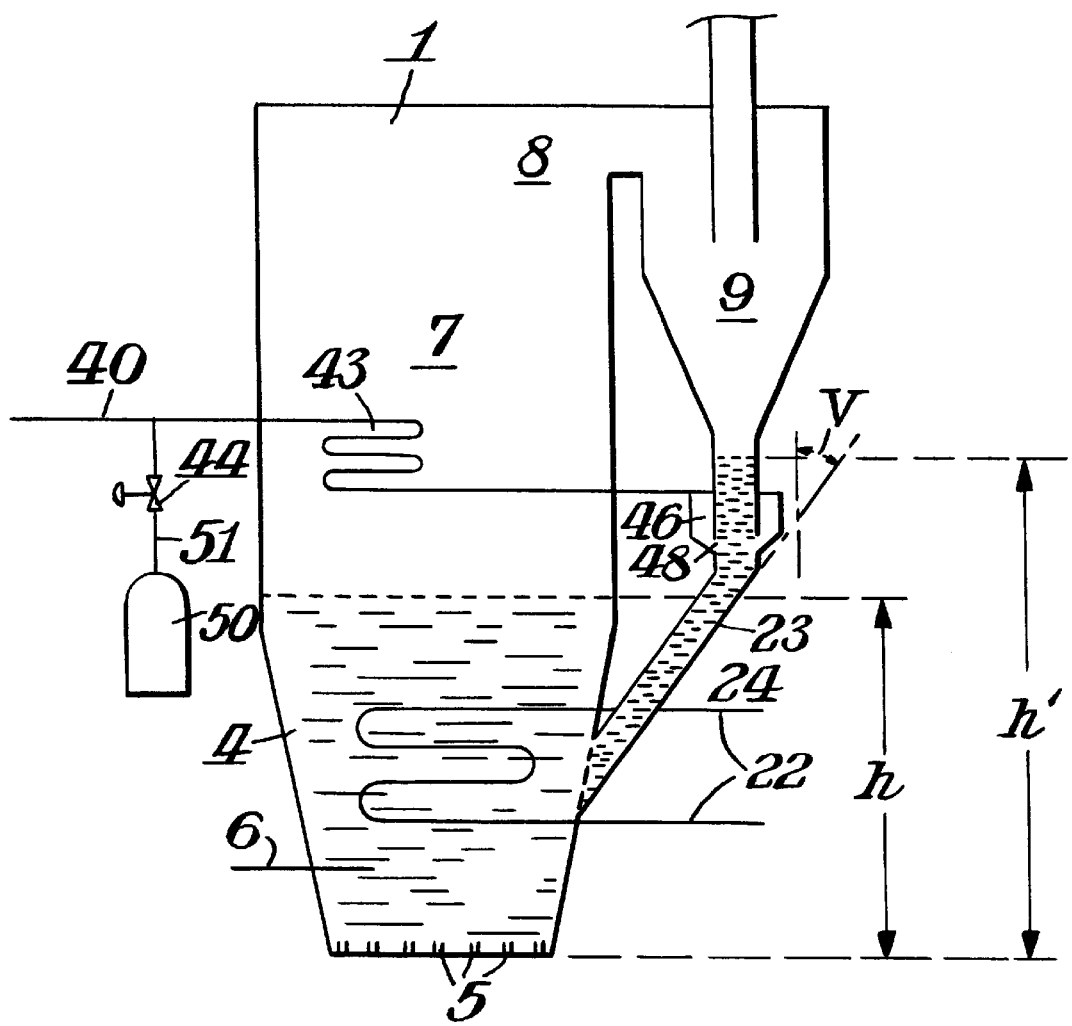

The recirculation device disclosed in FIG. 3 comprises a channel 23 which extends outside the combustion chamber 1 and in a direction which forms an angle v to a vertical axis. The channel 23 extends through a passage in the wall of the combustion chamber 1, which passage forms the orifice of the channel 23. The angle v may for example be between 10 and 50°, preferably between 21 and 39°. By means of such a sloping recirculation channel 23 the quantity of gas flowing upwardly in the channel is reduced, resulting in the formation of a column 24 of material extending upwardly above the bed 4. Merely the weight of this column 24 of material ensures an equal and continuous discharge of the solid material separated. In order to reduce the recirculation velocity of the solid material flowing downwardly, also in this case the cross-section area at said passage, i.e. in the proximity of the orifice of the channel 23, may be less than at a higher position of the channel 23. The cyclone 9 is in this example located completely outside the combustion chamber 1 and is connected therewith via the schematically disclosed pipe conduit 8. Although the orifice of the channel 23 in FIG. 3 is located at the same height as the tube set 22, it should be noted that the orifice disclosed in FIG. 3 may be located below or above the level of the tube set 22.

Figure 4:
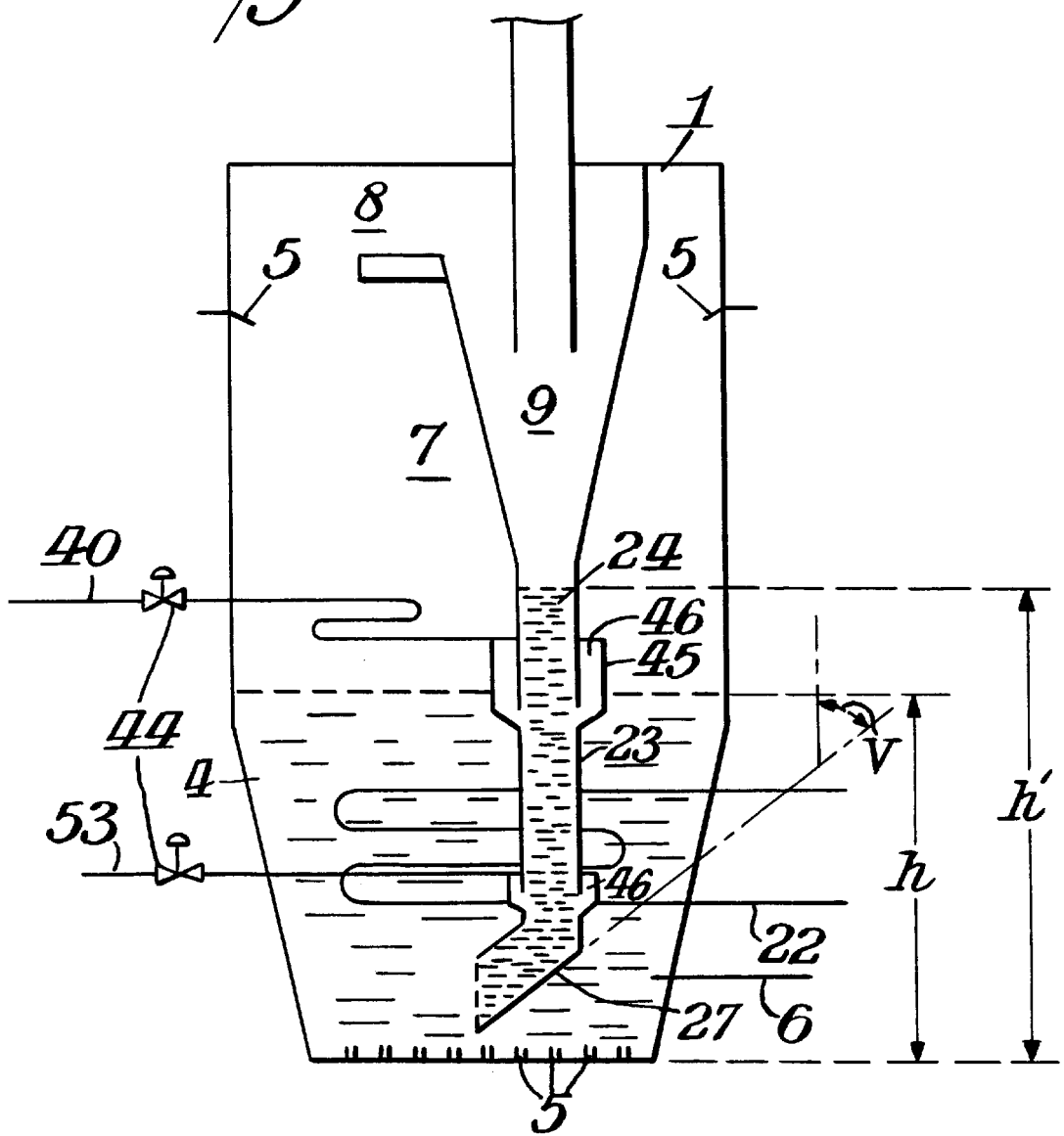

FIG. 4 discloses another variant of a recirculation device having a channel 23 extending essentially vertically. In this case the recirculation device comprises a portion 27 of the channel 23 sloping downwardly, which reduces the quantity of gas flowing upwardly in the channel 23 and functions as a sliding surface for the solid particulate material flowing downwardly. The portion 27 forms a passage having a flow area which has such a dimension that a column 24 of material is formed and having a height h' exceeding the height h of the bed 4. The cyclone 9 disclosed in FIG. 4 is enclosed in the combustion chamber 1 and located in its upper part, i.e. the freeboard 7.

Figure 5:
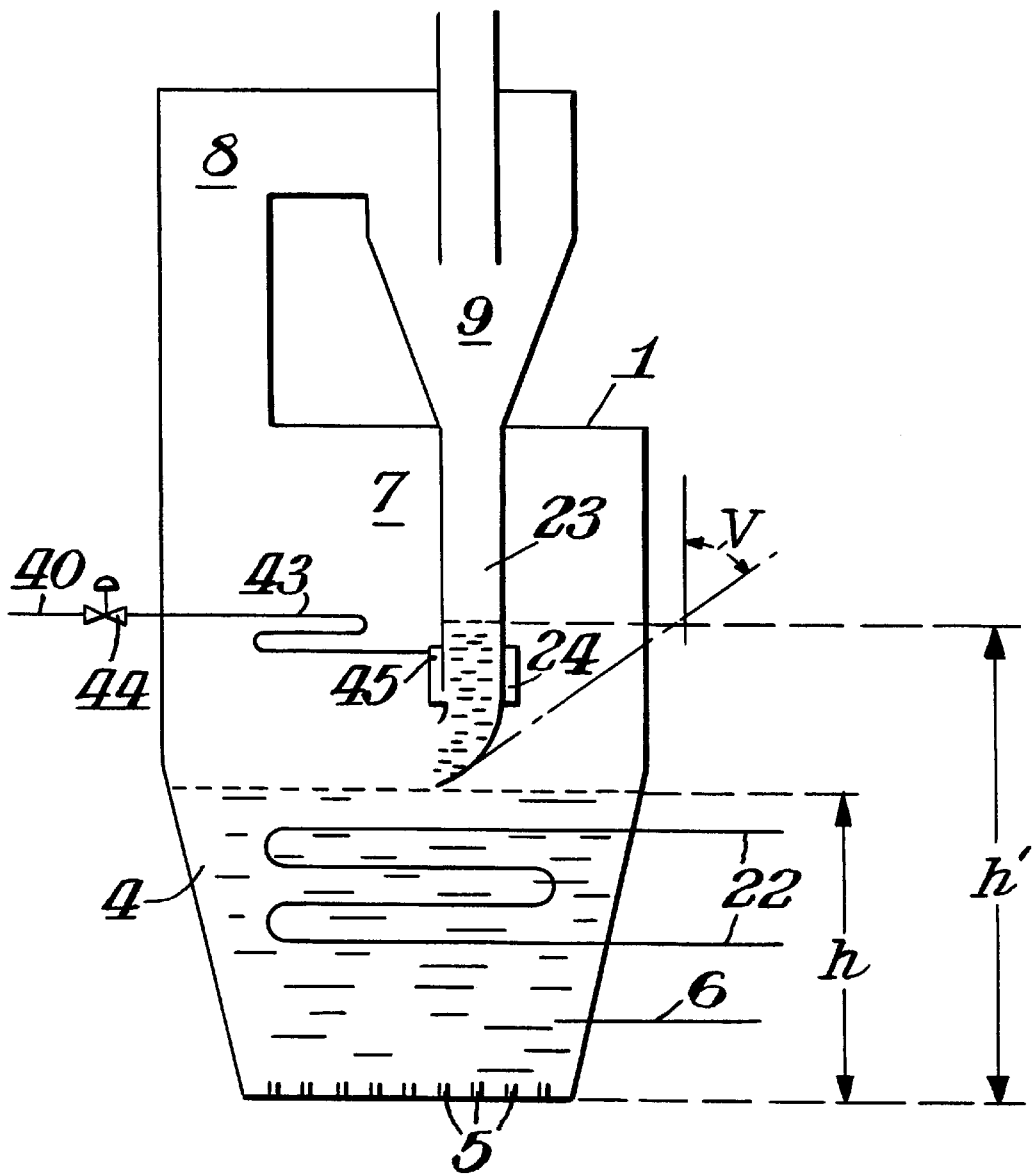

FIG. 5 discloses another variant of a recirculation device having a channel 23 similar to the one in FIG. 2 but having an orifice in the freeboard 7 of the combustion chamber 1.

FIGS. 6–12 disclose further variants of the recirculation device according to the invention. In FIG. 6 this device comprises a channel 23 similar to the one in FIG. 1 but the lower plate 25 extends essentially perpendicular to a vertical axis. This embodiment is especially simple from a manufacturing point of view. There will be formed an accumulation 29 of material flowing downwardly in the corner formed by the plate 25 and the channel 23. This accumulation will function as a sliding surface for the material flowing downwardly. The channel 23 disclosed in FIG. 7 comprises a portion 27 similar to the one in FIG. 4 but the lower part of the portion 27 sloping with the angle v is prolonged in the direction of the outflowing material in relation to the upper part of the sloping portion 27. In such a manner the orifice of the channel 23 will have an angle a of inclination in relation to a vertical axis. By this embodiment the quantity of gas flowing upwardly in the channel 23 is reduced. The channel disclosed in FIG. 8 is similar to the one disclosed in FIG. 1 but the plate 25 sloping with the angle v is shortened in such a manner that seen from beneath the plate does not cover the whole cross-section area of the channel 23. Thus, the orifice of the channel 23 forms an angle b to a vertical axis. By such an embodiment most of the gas flowing upwardly will certainly be prevented from entering the channel 23 but a part thereof is permitted to mix up with the column 24 of material. This may be desirable in certain applications when one wishes a gas mixture in the material separated. In FIG. 9 the channel 23 comprises a plate 30 being fixed in the channel 23 in such a manner that an essentially peripheral opening is formed between the plate 30 and the channel 23. The plate 30 may be fixed by means of a number of barlike rods schematically disclosed at 31. It should be noted that the plate 30 also may be provided sloping with an angle v in relation to a vertical axis. The recirculation device disclosed in FIG. 10 comprises a downwardly completely open channel 23 having an orifice precisely above a bottom plate 32 of the combustion chamber 1. In the portion 33 of the bottom plate 32 being located below the channel 23 there are no fluidizing nozzles 5 which otherwise are provided over essentially the whole surface of the bottom plate 32. In such a manner no gas flowing upwardly from the nozzles 5 may enter the channel 23 and causing a fluidization of the material present therein. Thereby, a column 24 of material may be built up and an uniform and continuous discharge of material to the lower part of the bed is obtained. The material so discharged will thereafter be brought upwardly in the bed due to the gas flowing upwardly from the nozzles 5. FIG. 11 discloses a recirculation device similar to the one in FIG. 10 but the portion 33 provided in the bottom plate 32 and having no fluidizing nozzles 5 is raised in relation to the other surface of the bottom plate 32. The recirculation device disclosed in FIG. 12 comprises the channel 23 having a funnel-shaped conical extension 34 being open downwardly. In this extension 34 a cone is provided by means of one or more attachment plates 36. The extension 34 and the cone 35 form a cone angle v in relation to the vertical axis. This angle v is, as these in the preceding example, between 20 and 90°, preferably between 21 and 39°.

Furthermore, the power plant comprises a conduit 40 for the supply of a gaseous medium to the standing column 24 of material in the channel 23. In the embodiment disclosed in FIG. 1, the conduit 40 is provided to supply air from the compressor 15. Furthermore, the conduit 40 disclosed in FIG. 1 comprises two branch conduits 41 and 42 for feeding the gaseous medium at different heights in the standing column 24 of material. Furthermore, the conduit 40 passes a heat exchanger member 43 on its way to the column 24 of material. The heat exchanger member 43 is provided in the combustion chamber 1, for example in the freeboard 7. In such a manner the gaseous medium may be preheated to a suitable temperature of about 600–900° C., preferably about 700–800° C. The supply of a gaseous medium is regulated by means of a regulating valve 44 which may be connected to the overall control system of the plant (not disclosed). The branch conduits 41 and 42 have an orifice in a cylinder 45 forming an annular space 46 between the cylinder 45 and the channel 23. The space 46 is delimited upwardly and downwardly by wall members 47 and is thus closed against the combustion chamber 1. Between the annular space 46 and the channel 23 there is at least one passage 48 provided in the lower part of the space 46 for a throughflow into the channel 23 of the gas supplied via the conduit 40. Furthermore, at least one of the branch conduits 41 and 42 may comprise a throttling 49. As is disclosed in FIG. 2, the gaseous medium supplied to the standing column 24 of material may also be supplied from a separate external source 50. This source 50 may comprise a suitable gas, for example air, nitrogen or argon. As is disclosed in FIG. 3, the gaseous medium may be a mixture of the combustion air supplied by the compressor 15 via the conduit 40 and such an additional medium which is supplied from a separate source 50 via the conduit 51. It should be noted that the additional medium also may comprise steam. Moreover, FIG. 2 discloses that the recirculating channel 23 may be provided with an additional space for the separated material present in the column 24 of material. This additional space may be formed by, as disclosed, an enlargement 52 of the channel 23. In such a manner, the time of presence for the separated material in the channel 23 is further increased. In FIG. 4, it is disclosed how combustion air may be supplied to the channel 23 in its upper part via the conduit 40 and steam to the lower part of the channel 23 via the conduit 53.

The function of the power plant according to the invention will now be explained more closely with reference to FIG. 1 disclosing the supply of combustion air from the compressor 15 via the conduit 40 to the heat exchanger 43 provided in the freeboard 7 of the combustion chamber 1. Thereby, the combustion air will have a temperature of about ca 850° C. This combustion air is then supplied to the column 24 of material via the branch conduits 41 and 42. Due to this air supply, the partial pressure of air in the column 24 of material will increase, thereby decreasing the partial pressure of carbon dioxide therein. In such a manner appropriate conditions for the lime, $CaCO_3$, present in the column 24 of material to release carbon dioxide and form quick lime, $CaO$, have been created by heating the air and increasing the air pressure. The quick lime formed has a good ability to bind sulphur dioxide formed during the combustion in the combustion chamber 1, thereby forming gypsum, $CaSO_4$.

Furthermore, the power plant according to the invention may be provided with equipment for a so called freeboard combustion, see FIGS. 2 and 4. This means that a complementary fuel is injected via the supply nozzles 54 into the freeboard 7 of the combustion chamber 1. The complementary fuel may be oil, gas or any other volatile substance, or advantageously the same particulate fuel as is combusted in the bed 4. Due to the recirculation via the channel 23 the undesired particles formed during the combustion of the complementary fuel will be brought into contact with the absorbent. Thereby, the temperature of the material present in the channel 23, in particular at low load, may be raised by means of the freeboard combustion.

The present invention is not limited to the embodiments disclosed above but may be varied and modified within a scope of the following claims. It should be noted that the channel portions disclosed in FIGS. 6–12 may be provided with some or several of the gas supply member disclosed in FIGS. 1–5.

In certain applications of the present invention, it might be advantageous to provide two or more separating members 9 in a parallel configuration with each other. Each separating member 9 is in this case preferably provided with a recirculation channel 23. Such a parallel configuration may for example be necessary in order to achieve an appropriate separation efficiency.

What is claimed is:

1. A method of combustion of a fuel, comprising the steps of:
   combusting the fuel in a combustion chamber enclosing a pressurized fluidized bubbling bed to form combustion gases in the combustion chamber;
   supplying an oxygen-containing gas to the bed from beneath;
   supplying a lime-containing absorbent to the bed;
   collecting combustion gases formed during the combusting step;
   purifying the combustion gases by separating solid material therefrom; and
   recirculating the separated solid material to the combustion chamber through a channel, wherein the channel has an orifice connected to the bed, and a gaseous medium is supplied in a controlled manner to the separated solid material present in the channel to displace the combustion gases therein so that the partial pressure of carbon dioxide in the channel is lowered, thereby permitting a reaction of the absorbent in the channel to quick lime.

2. A method according to claim 1, wherein the combustion chamber comprises a space above the bed, and the channel is located in the space and in the bed.

3. A method according to claim 1, wherein the gaseous medium is preheated prior to being supplied to the separated material in the channel.

4. A method according to claim 3, wherein the gaseous medium is preheated to a temperature of about 600° C. to 900° C.

5. A method according to claim 1, wherein the gaseous medium comprises air.

6. A method according to claim 1, wherein the gaseous medium comprises steam.

7. A method according to claim 1, wherein the gaseous medium comprises nitrogen.

8. A method according to claim 1, wherein the gaseous medium comprises a combination of at least two gases selected from the group consisting of air, nitrogen, and steam.

9. A method according to claim 1, wherein the gaseous medium is supplied to the channel at a plurality of levels.

10. A method according to claim 9, wherein air and/or nitrogen are/is supplied to the channel at a higher level and steam is supplied to the channel at a lower level.

11. A method according to claim 1, wherein the length of time the material resides in the channel is increased by an enlarged portion of the channel.

12. A method according to claim 1, wherein the absorbent comprises limestone or dolomite.

13. A method according to claim 1, wherein the material is supplied to the channel in such a manner that the weight of a column of material recirculates the material in a continuous flow through a passage having a constant opening area and being provided in a lower portion of the channel.

14. A method according to claim 13, wherein the height of the column of material exceeds the height of the bed.

15. A method according to claim 13, wherein the oxygen-containing gas provided to the bed from beneath is prevented from entering the channel.

16. A combustion plant comprising:
   a combustion chamber enclosing a pressurized fluidized bubbling bed, wherein a fuel is combusted and forms combustion gases within said combustion chamber while a lime-containing absorbent is supplied to the bed;
   a purification device for purifying the combustion gases, said purification device having a separating member for separating particulate material from the combustion gases, and a channel connecting the separating member and said combustion chamber for recirculating the separated material to said combustion chamber, wherein the channel has an orifice connected to the bed;
   at least one gas supply member connected to the channel for supplying a gaseous medium to the separated material present in the channel to displace the combustion gases in the channel, lower the partial pressure of carbon dioxide, and enable reaction of the absorbent; and
   a heat exchanger provided in said combustion chamber for preheating the gaseous medium supplied to said at least one gas supply member.

17. A combustion plant according to claim 16, wherein said combustion chamber comprises a space above the bed, the channel being located in the space and in the bed.

18. A combustion plant according to claim 16, wherein said at least one gas supply member supplies air to the material present in the channel.

19. A combustion plant according to claim 16, wherein said at least one gas supply member comprises at least one gas feeding device provided in a wall of the channel.

20. A combustion plant according to claim 19, wherein the at least one gas feeding device comprises a cylinder provided around the channel and having a limiting wall so that a closed annular space is formed between the channel and the cylinder, and the wall of the channel comprises a passage between the interior of the channel and the closed annular space.

21. A combustion plant according to claim 16, wherein said at least one gas supply member comprises a plurality of gas feeding devices supplying the gaseous medium to the channel at a plurality of levels.

22. A combustion plant according to claim 16, wherein the channel comprises an enlarged portion that increases the volume of material held in the channel.

23. A combustion plant according to claim 16, wherein the channel comprises passive portions, and a column of material is formed in the channel during the operation of the combustion plant, the passive portions forming a passage in the lower part of the channel that permits the weight of the column of material to discharge the material therethrough in a continuous flow.

24. A combustion plant according to claim 23, wherein the passage has a constant flow area.

25. A combustion plant according to claim 23, wherein the column of material formed during the operation of the combustion plant has a height exceeding the height of the bed in said combustion chamber.

26. A combustion plant according to claim 23, wherein the passive portions prevent a gas from beneath from entering the channel.

27. A combustion plant according to claim 23, wherein the passive portions comprise surfaces provided at a lower end of the channel and covering a majority of the cross-sectional area of the channel.

28. A combustion plant according to claim 27, wherein the surfaces form an angle of inclination to a vertical axis of about 20° to 90°.

29. A combustion plant according to claim 16, wherein said combustion chamber and the separating member are enclosed in a pressure vessel, the combustion plant further comprising compressors maintaining a pressure above atmospheric pressure in the pressure vessel.

30. A combustion plant according to claim 16, wherein the bed has a height between about two meters and six meters.

31. A combustion plant according to claim 16, wherein the channel orifice connects to the bed beneath a tube arrangement provided in the bed for heating water and/or superheating steam.

32. A combustion plant according to claim 16, further comprising compressors for feeding oxygen-containing gas at a velocity of 0.5 m/s to 2.0 m/s to the bed through nozzles provided beneath the bed.

* * * * *

UNITED STATES PATENT AND TRADEMARK OFFICE
CERTIFICATE OF CORRECTION

PATENT NO.    : 6,389,995 B1
DATED         : May 21, 2001
INVENTOR(S)   : Christopher Adams et al.

It is certified that error appears in the above-identified patent and that said Letters Patent is hereby corrected as shown below:

<u>Title page,</u>
Item [30], Foreign Application Priority Data, reads "December 4, 1996" and should read -- April 12, 1996 --.

Signed and Sealed this

Fourteenth Day of January, 2003

JAMES E. ROGAN
*Director of the United States Patent and Trademark Office*